E. J. BELL.
CLAMPING MACHINE.
APPLICATION FILED FEB. 24, 1914.

1,122,570.

Patented Dec. 29, 1914.
2 SHEETS—SHEET 1.

WITNESSES
E. Farrell
Mary Monahan

INVENTOR
Edwin J. Bell
BY
Louis J. Monahan
ATTORNEY.

E. J. BELL.
CLAMPING MACHINE.
APPLICATION FILED FEB. 24, 1914.
1,122,570.
Patented Dec. 29, 1914.
2 SHEETS—SHEET 2.
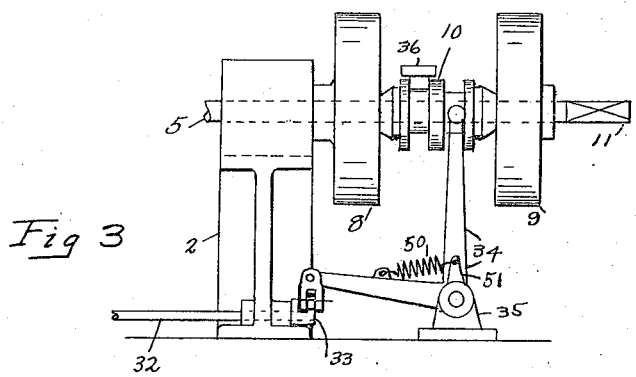
Fig 3
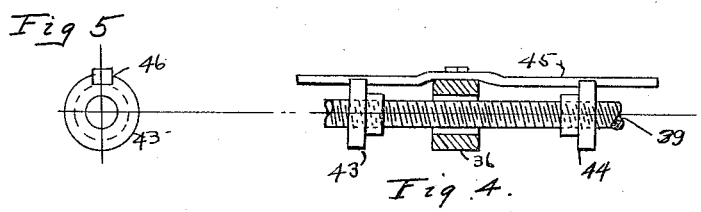
Fig 5
Fig 4.
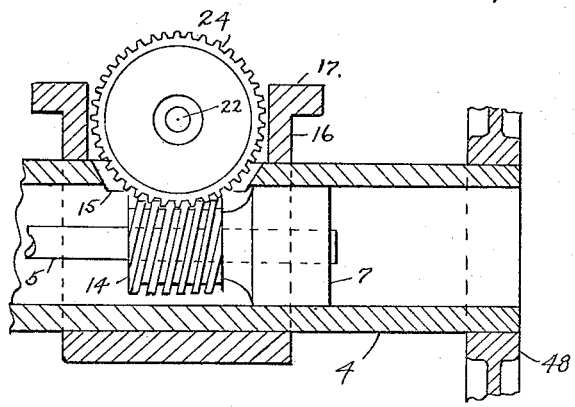
Fig 6.
Witnesses
J. Farrell
Mary Monahan
Inventor
Edwin J Bell
By Louis J. Monahan
Attorney

UNITED STATES PATENT OFFICE.

EDWIN J. BELL, OF OSHKOSH, WISCONSIN.

CLAMPING-MACHINE.

1,122,570. Specification of Letters Patent. Patented Dec. 29, 1914.

Application filed February 24, 1914. Serial No. 820,499.

*To all whom it may concern:*

Be it known that I, EDWIN J. BELL, citizen of the United States, residing at Oshkosh, in the county of Winnebago and State of Wisconsin, have invented certain new and useful Improvements in Clamping-Machines, of which the following is a specification.

The invention relates to a new and useful clamp and has for the object the provisions of convenient mechanism for clamping and squeezing glued work, principally, doors of the dowel or tenoned type. A further object being to economically construct the device so it will stop automatically and be capable of rapid adjustment in the point of stopping. A further object being the carrying out of means whereby the device can be tilted from the horizontal to an incline position and securely held in the desired position.

Figure 1:
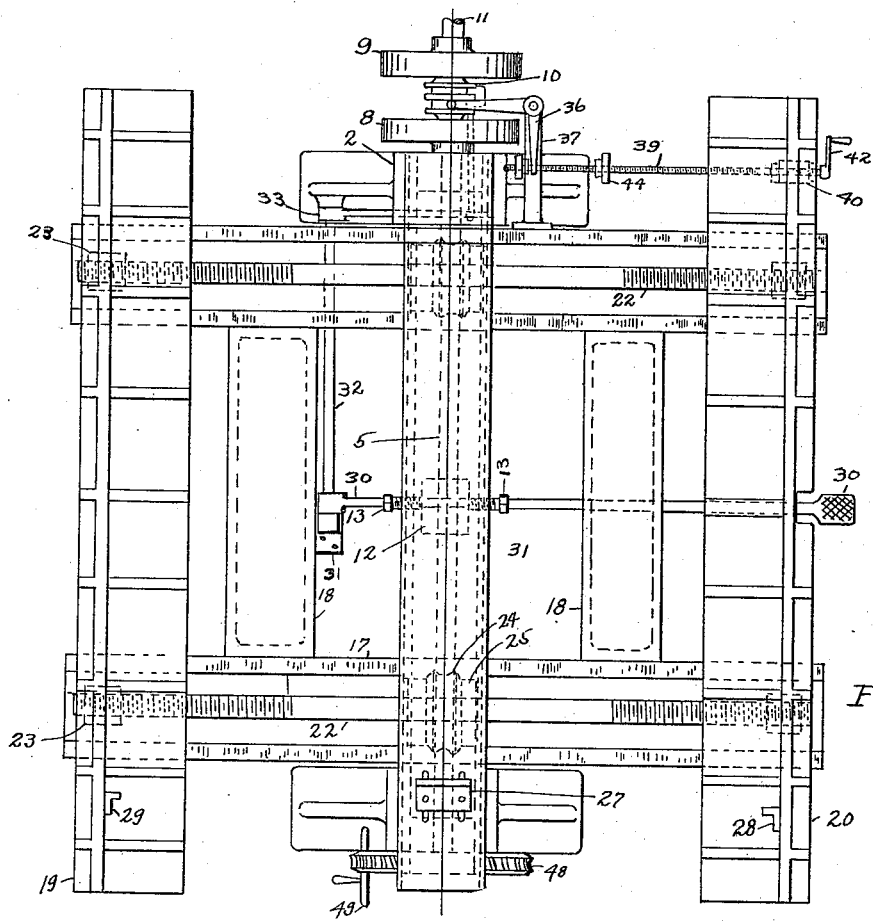
Figure 2:
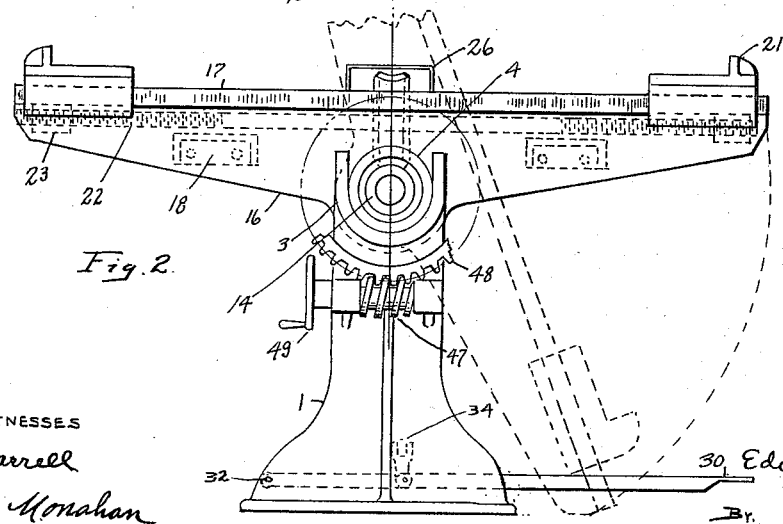

In the drawings Figure 1 is a plan view of the clamp; Fig. 2 an end view; Fig. 3 a detail of the driving clutch pulleys; Fig. 4 a detail of the knock off adjustment; Fig. 5 an end view of same and Fig. 6 a detail showing the clamp screw drive.

Two heavy pedestal frames 1 and 2 are formed of cast iron substantially ribbed and having a large foot or base supporting surface, the upper part of the supports have a half bearing 3 formed therewith in which a heavy, thick walled pipe 4 is fitted to rock or partially rotate therein. Within the pipe, a driving shaft 5 is mounted and journaled in bushings or bearings 7 which are fitted securely within the pipe. The shaft 5 extends out at one end to receive the driving pulleys 8 and 9. The pulleys are engageable to the shaft through friction clutches which are actuated by a flanged collar 10 slidable on the shaft between the pulleys. An outboard bearing may be attached to steady the end of the shaft at 11 if desired. The shaft is also steadied by a center bearing 12, held within the pipe by adjusting screws 13.

Secured to the shaft 5 near each end bearing is a worm 14, one being right hand and one left hand to compensate for end thrust. Openings 15 are formed in the pipe above the worms to permit a worm wheel 24 to pass therethrough. A large heavy clamping frame is mounted rigidly on the pipe and is composed of a pair of ribbed castings 16 having slide ways 17 planed the entire length, the castings have double ribs leaving an open box like construction as shown. The two castings 16 are rigidly braced and held together by two spacing beams 18 bolted therebetween.

A pair of clamping rails 19 and 20 are fitted to slide laterally along the slide ways 17 and have heavy braced flanges 21 formed therewith. For sliding the clamp rails a pair of double end right and left screws 22 are fitted centrally with a worm gear 24 which in turn is meshed with the worm 14, and extend between the ribs of the castings 16. Nuts 23 are fitted to the clamp rails at four points as shown into which the screws 22 fit.

It will be seen that by revolving the screws 22 the clamp rails 19 and 20 will be drawn together or apart according to the direction of rotation of the screws. Bearings 25 are provided to support the shaft 22 close to the gear. A channel iron 26 is fitted to cover the upward extending gears and to form a rest the same height as the surfaces of the clamp rails 20 and has an adjustable end guide 27 for butting the work against when operating the machine. Two guides 28 and 29 are further provided and adjustable on the clamp rails.

For operating the friction clutches a foot lever 30 is provided which is secured to an extending shaft 32, said shaft being journaled in a floor stand 31. The shaft also has a bearing in the support 2 and has a lever 33 secured to its end. A bell crank lever 34 fulcrumed to a floor plate 35 Fig. 3 is fitted to engage a groove in the sliding collar 10 and has its other end linked to the lever 33, so that by pressure on the foot pedal 30 the inner clutch 8 is engaged which will drive the screws in one direction to close the clamps. An automatic stop is provided and consists of a bell crank lever 36 fulcrumed to a bracket 37 extending from the support, and has one end engaging a groove in the sliding collar 10 and the other end fitted with a fork. A screw 39 is fitted to a bearing 40 having thrust collars each side and being secured to the clamp rail as shown. The screw 39 has a crank 42 attached thereto for adjusting the point of stopping and is threaded nearly its entire length, passing through the fork of the lever 36. Two hand wheels 43 and 44 are fitted to screw on the screw 39 which can be set at any point to strike the lever as the rail 20 travels in order to stop its travel when a predetermined pressure is given to the work, and to throw out from the other clutch when the rails are wide open. To prevent the hand wheels from turning a flat spring 45 is fitted to the forked lever 36 and adapted to spring into slots 46 previously formed in the hand wheels.

A spring 50 is connected to the lower arm of the lever 34 and to an extending portion of the floor bearing 51 to change engagement from clutch 8 to 9 automatically but not of sufficient strength to disengage clutch 8 without assistance from the hand wheel 44 which strikes the lever 36 during the inward travel of the clamps.

The whole frame can be used in a horizontal position or at any angle up to near vertical, the dotted lines Fig. 2 shows the upright or near vertical position. For turning the frame a worm 47 and gear 48 are provided with hand wheel 49, the gear 48 being rigidly secured to the end of the pipe 4, with this gear the frame can be easily turned to any desired working position and it will be self locking by virtue of the worm and gear, however a separate locking means can be provided if desired.

In operation—the machine is used in either vertical or horizontal position, the vertical being the most convenient for one man operation on the smaller work while the horizontal is found best where two men handle larger work from both sides. The door, previously glued, is rested on the clamp rails 19 and 20, against the edges 21 and against the gages 27, 28 and 29 and the foot pedal 30 pressed, this engages the clutch 8 which is driven in the proper direction to draw the clamp together, and the work is squeezed together until the clutch is tripped by the hand wheel 44 contacting with the lever 36 which throws the collar 10 to release the clutch, which is immediately drawn over and into engagement with clutch 9 by means of the spring 50, the clutch 9 being revolved in the opposite direction to that of clutch 8. Upon engagement of clutch 9 the clamps are drawn apart until the hand wheel 43 strikes the lever 36 when the clutch 9 is released stopping the machine. For variable widths of work when the automatic stop is to effect stopping at a different point, the crank 42 is given a turn or so in the direction desired, when it will draw both hand wheels one way or the other to give earlier or later relative stopping. The hand wheels can be adjusted separately by lifting the spring 45 and turning them one way or the other and again allowing the spring to drop in the notch. The tilting of the frame is accomplished by the hand wheel 49 through worm and gear as described.

I claim:

1. A door clamp including a supporting frame, a clamping frame mounted oscillatory thereon and having a driving shaft positioned in axis of oscillation, clamping jaws slidable on ways on the clamping frame and means operative from the driving shaft for sliding the clamp jaws on the ways and means for rigidly holding the clamping frame in the desired position.

2. A door clamp including a frame, clamping jaws slidable thereon, means for swinging and locking the frame at any point from the horizontal to near vertical position, means for positively sliding the clamping jaws comprising a driving shaft journaled axially with the swinging point of the frame and screw devices coöperative between the driving shaft and clamping jaws.

3. A door clamp comprising a frame having slidable clamping jaws fitted thereon and actuated by right and left screws, said screws being gear driven at their central portions by means of a driving shaft journaled perpendicularly to the screws and means for tilting the frame bodily about the driving shaft from horizontal to near vertical position.

4. In a door clamp the combination with supports of a frame trunnioned in the supports and capable of being positioned at any point from the horizontal to near vertical position, clamping jaws slidable on the frame, a driving shaft journaled axially with the trunnions, screw devices coöperative with the driving shaft to slide the jaws independent of the position of the frame.

5. In a door clamp the combination with supporting stands, a tube journaled in the stands, a frame secured to the tube and capable of limited oscillating movement therewith, clamping jaws mounted slidingly on the frame, a revoluble shaft journaled within the tube and means coöperative therewith for sliding the jaws.

6. In a door clamp the combination with supporting stands, a tube journaled in the stands, a frame secured to the tube and capable of limited oscillating movement therewith, clamping jaws mounted to slide on the frame and having threaded nuts attached thereto, screws fitted to the threaded nuts and passing perpendicularly adjacent to the tube and having gears secured thereon, a driving shaft journaled within the tube and having gears secured thereon and adapted to mesh with the gears on the screws, means for rotating the driving shaft and means for controlling the direction of rotation thereof.

7. In a door clamp the combination with supporting stands, a tube journaled therein and carrying a frame, the frame being capable of maintaining a position at any point from the horizontal to near vertical by swinging with the tube, a driving shaft journaled within the tube and having clutch devices attached thereto for rotating same in either direction, clamping jaws slidable on the frame and means coöperative with the driving shaft for sliding same, adjustable devices coöperative with the jaws to start or stop the driving shaft.

8. In a door clamp the combination with supporting means having a tube journaled therein, a frame secured to the tube and capable of rotary movement with the tube, clamps mounted to slide on the frame and having threaded members secured thereto, screws fitted to the threaded members and having a gear secured substantially at their center, a revoluble shaft journaled axially in the tube and having gears secured thereon and adapted to mesh with the gears on the screws, friction clutches mounted on the revoluble shaft and being rotatable in opposite directions, adjustable means coöperating between the clamps and the friction clutches and a foot lever communicating with one of the clutches.

9. In a door clamp the combination with supporting means having an oscillatable tube journaled therein, frame members secured to the tube and having clamping devices slidable thereon, a worm gear secured to the tube, a worm meshing therewith and journaled to the supporting means and having an extending operating crank.

In testimony whereof I affix my signature, in the presence of two witnesses.

EDWIN J. BELL.

Witnesses:
L. J. MONAHAN,
F. V. MCMANAMY.

Copies of this patent may be obtained for five cents each, by addressing the "Commissioner of Patents, Washington, D. C."